United States Patent
Wang et al.

(10) Patent No.: US 10,952,182 B2
(45) Date of Patent: Mar. 16, 2021

(54) METHOD OF NOTIFYING MBMS SERVICE INFORMATION OF A NEIGHBORING CELL AND CORRESPONDING APPARATUS

(75) Inventors: He Wang, Shanghai (CN); Chandrika Worrall, Newbury (GB)

(73) Assignee: Nokia Technologies OY, Espoo (FI)

( * ) Notice: Subject to any disclaimer, the term of this patent is extended or adjusted under 35 U.S.C. 154(b) by 536 days.

(21) Appl. No.: 14/239,087

(22) PCT Filed: Jul. 31, 2012

(86) PCT No.: PCT/IB2012/001568
§ 371 (c)(1),
(2), (4) Date: Jun. 4, 2014

(87) PCT Pub. No.: WO2013/024334
PCT Pub. Date: Feb. 21, 2013

(65) Prior Publication Data
US 2014/0269566 A1  Sep. 18, 2014

(30) Foreign Application Priority Data
Aug. 15, 2011  (CN) .......................... 201110233473.2

(51) Int. Cl.
*H04W 68/00* (2009.01)
*H04W 4/06* (2009.01)
*H04W 76/40* (2018.01)
*H04W 48/12* (2009.01)

(52) U.S. Cl.
CPC .......... *H04W 68/005* (2013.01); *H04W 4/06* (2013.01); *H04W 76/40* (2018.02); *H04W 48/12* (2013.01)

(58) Field of Classification Search
None
See application file for complete search history.

(56) References Cited

U.S. PATENT DOCUMENTS

2010/0178895 A1 * 7/2010 Maeda ................ H04W 76/007
455/404.1
2011/0149827 A1   6/2011 Na et al.
(Continued)

FOREIGN PATENT DOCUMENTS

CN          102149044          8/2011

OTHER PUBLICATIONS

"MCCH change notification uses DCI 1C", 3GPP TSG-RAN WG2 Meeting #68, R2-097456, Jeju, Korea, Nov. 9-13, 2009.
(Continued)

*Primary Examiner* — Robert C Scheibel
(74) *Attorney, Agent, or Firm* — Fay Sharpe LLP (57) ABSTRACT

The present invention discloses a method of notifying a user terminal of MBMS service information of at least one neighboring cell of a cell of a base station where the user terminal camps, and a method of receiving from the base station where the user terminal camps the MBMS service information of at least one neighboring cell of the cell of the base station, and a corresponding user terminal and a base station. In the present invention, in a system information block SIB, the multimedia broadcast multicast service MBMS service information of the at least one neighboring cell is transmitted to the user terminal. According to the present invention, regardless of whether a current cell has MBMS service transmission or not, the MBMS service information (if any) of at least one neighboring cell of the current cell is transmitted to the UE camping on the current cell so that the UE can know in advance which neighboring cell the MBMS service of its interest is located in so as to better achieve continuity of the MBMS service.

14 Claims, 4 Drawing Sheets

(56) References Cited

U.S. PATENT DOCUMENTS

2011/0305184 A1* 12/2011 Hsu ............... H04L 65/4076
370/312
2012/0236776 A1* 9/2012 Zhang ............. H04W 48/12
370/312
2013/0039250 A1* 2/2013 Hsu ............... H04H 20/71
370/312

OTHER PUBLICATIONS

Huawei et al., "(Re)Selecting appropriate frequency/cell for service continuity," $3^{rd}$ Generation Partnership Project (3GPP), 3GPP TSG-RAN WG2 Meeting #74, R2-113187, pp. 1-7, XP050495357, Barcelona, Spain, May 9-13, 2011.

Alcatel-Lucent Shanghai Bell et al., "Enhancement of cell reselection for MBMS service continuity," $3^{rd}$ Generation Partnership Project (3GPP), 3GPP TSG-RAN WG2 Meeting #73bis, R2-112230, pp. 1-4, XP050494395, Shanghai, China, Apr. 11-15, 2011.
"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0, pp. 1-194, Jun. 2011.
Alcatel-Lucent Shanghai Bell, "Neighbouring cell MBMS service information for service continuity," $3^{rd}$ Generation Partnership Project (3GPP), 3GPP TSG-RAN WG2 Meeting #75, R2-114280, pp. 1-2, XP050539734, Athens, Greece, Aug. 22-26, 2011.
International Search Report for PCT/IB2012/001568 dated Jan. 3, 2013.
Zte, P., "Service continuity scenario analysis", R2-111925, 3GPP TSG RAN WG2 #73bis, Apr. 11-15, 2011, Shanghai, China.

* cited by examiner

METHOD OF NOTIFYING MBMS SERVICE INFORMATION OF A NEIGHBORING CELL AND CORRESPONDING APPARATUS

FIELD OF THE INVENTION

The present invention relates to the field of communication, and particularly to a method of notifying a user terminal of multimedia broadcast multicast service MBMS service information of at least one neighboring cell of a cell of a base station where the user terminal camps, a base station for notifying a user terminal camping on the base station of multimedia broadcast multicast service MBMS service information of at least one neighboring cell of the cell of the base station, a user terminal for receiving from a base station where the user terminal camps multimedia broadcast multicast service MBMS service information of at least one neighboring cell of a cell of the base station, and a method of receiving from a base station where a user terminal camps multimedia broadcast multicast service MBMS service information of at least one neighboring cell of a cell of the base station.

BACKGROUND OF THE INVENTION

There is a need for a user terminal UE to obtain in advance multimedia broadcast multicast service MBMS service information of at least one neighboring cell of a cell of a base station where the UE camps. For example, the UE in an idle mode can automatically take a cell having MBMS service of its interest as a cell that is the most likely to be selected during reselection of cell, so as to obtain the MBMS service of its interest as soon as possible.

Currently, only in a cell having MBMS service transmission, MBMS service information of the cell and related configuration control information is broadcasted. That is to say, MBMS service information is not transmitted in a cell without MBMS service transmission, and in a cell having MBMS service transmission, only the MBMS service information and configuration control information of the cell are transmitted.

Therefore, a scheme is needed to transmit MBMS service information of at least one neighboring cell of a current cell if there is such a neighboring cell having an MBMS service, regardless of whether the current cell has MBMS service transmission or not.

SUMMARY OF THE INVENTION

According to a first aspect of the present invention, there is provided a method of notifying a user terminal of multimedia broadcast multicast service MBMS service information of at least one neighboring cell of a cell of a base station where the user terminal camps, comprising: in a system information block SIB, transmitting the multimedia broadcast multicast service MBMS service information of the at least one neighboring cell to the user terminal.

According to a second aspect of the present invention, there is provided a base station for notifying a user terminal camping on the base station of multimedia broadcast multicast service MBMS service information of at least one neighboring cell of a cell of the base station, comprising: a first transmitting module configured to transmit, in a system information block SIB, the multimedia broadcast multicast service MBMS service information of the at least one neighboring cell to the user terminal.

According to a third aspect of the present invention, there is provided a user terminal for receiving from a base station where the user terminal camps multimedia broadcast multicast service MBMS service information of at least one neighboring cell of a cell of the base station, comprising: a first receiving module configured to receive from the base station, in a system information block SIB, the multimedia broadcast multicast service MBMS service information of the at least one neighboring cell.

According to a fourth aspect of the present invention, there is provided a method of receiving from a base station where a user terminal camps multimedia broadcast multicast service MBMS service information of at least one neighboring cell of a cell of the base station, comprising: in a system information block SIB, receiving from the base station the multimedia broadcast multicast service MBMS service information of the at least one neighboring cell.

According to the present invention, regardless of whether a current cell has MBMS service transmission or not, MBMS service information of at least one neighboring cell of the current cell is transmitted to a UE camping on the current cell so that the UE can know in advance which neighboring cell the MBMS service of its interest is located in so as to better achieve continuity of the MBMS service.

BRIEF DESCRIPTION OF DRAWINGS

Other objects and effects of the present invention will be made more apparent and easier to understand through the following description with reference to the figures and as the present invention is understood more thoroughly, wherein, FIG. 1 schematically illustrates an environment in which the present invention can be implemented.

In all of the figures, the same reference number denotes the same, similar or corresponding feature or function.

DETAILED DESCRIPTION OF PREFERRED EMBODIMENTS

The basis idea of the present invention is to design a solution of notifying a user terminal of multimedia broadcast multicast service MBMS service information of at least one neighboring cell of a cell of a base station where the user terminal camps, so as to transfer the neighboring cell MBMS service information efficiently, keep on the current system architecture design principle and less impact on user terminals not supporting MBMS.

Specific embodiments of the present invention will be described in detail with reference to figures.

Figure 1:
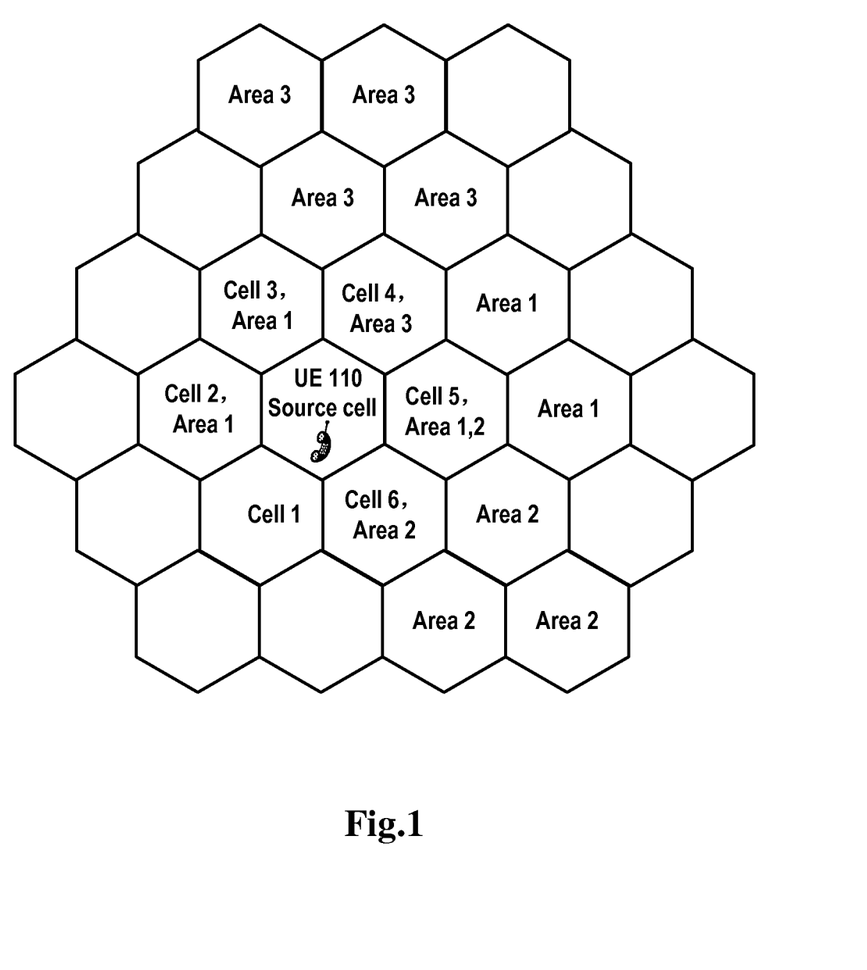

FIG. 1 schematically illustrates an environment in which the present invention can be implemented.

As shown in FIG. 1, the environment 100 comprises a plurality of cells, wherein cells marked with area 1 belong to MBSFN (Multicast Broadcast Single Frequency Network) area 1, cells marked with area 2 belong to MBSFN area 2, cells marked with area 3 belong to MBSFN area 3, and the remaining cells do not belong to any MBSFN area. Corresponding MBMS service transmission is performed in the MBSFN area 1, MBSFN area 2, and MBSFN area 3, respectively.

As can be seen from FIG. 1, a source cell where UE 110 camps does not belong to any MBSFN area, that is to say, the source cell where the UE 110 camps does not have MBMS service transmission. In its six neighboring cells, the neighboring cell 1 does not belong to any MBSFN area, the neighboring cell 2 belongs to the MBSFN area 1, the neighboring area 3 belongs to the MBSFN area 1, the neighboring cell 4 belongs to the MBSFN area 3, the neighboring cell 5 belongs to the MBSFN area 1 and the MBSFN area 2, and the neighboring cell 6 belongs to the MBSFN area 2. Besides, without loss of generality, it is assumed the MBSFN area 1 operates at frequency 1, the MBSFN area 2 operates at frequency 1 and the MBSFN area 3 operates at frequency 2.

Certainly, those skilled in the art can understand that the source cell where the UE 110 camps can also have MBMS service transmission. Besides, it is assumed the UE 110 is a user terminal supporting MBMS, and user terminals not supporting MBMS and not shown in FIG. 1 also camp on the source cell where the UE 110 camps.

Without loss of generality, in description of the present invention, a base station is in a one-to-one relationship with a cell, that is, one cell only has one base station, and one base station only serves one cell. Besides, without loss of generality, in the description of the present invention, it is assumed that the base station is eNB (evolved Node B).

Between neighboring cells, more specifically, between corresponding base stations of the neighboring cells, information, e.g., MBMS service information, can be exchanged via a wired and/or wireless backhaul link.

In the present invention, in a system information block SIB, a base station notifies a user terminal camping thereon multimedia broadcast multicast service MBMS service information of at least one neighboring cell of a cell of the base station.

According to one embodiment of the present invention, the above system information block is a system information block newly defined in order that the base station notifies the user terminal of the multimedia broadcast multicast service MBMS service information of the at least one neighboring cell. The system information block SIB can be independent to SIB 13 and only a UE supporting MBMS would interest to receive it. Therefore this new type of SIB can also be transmitted in a cell where there is no MBMS service transmission. According to a standard, updating notification of a SIB 13 is relevant to a value tag. When the SIB 13 changes, a UE in the system is notified that the SIB 13 changes via a system information change indicator method, which will affect all the UEs in the system, affect not only UEs supporting MBMS but also UEs not supporting MBMS.

In an embodiment of the present invention, the multimedia broadcast multicast service MBMS service information of the at least one neighboring cell comprises: a cell identifier; and a list of an identifier of an MBMS service supported by the cell identified by the cell identifier.

The MBMS service identifier is a sole identification of a MBMS service in a network. A UE or a base station can distinguish different MBMS services through MBMS service identifiers. Hence, regarding a UE checking whether its neighboring cells have a MBMS service of its interest, use of the MBMS service identifier information is already enough. In another aspect, a cell might have a plurality of neighboring cells, so neighboring cell identifier information is needed to distinguish different neighboring cells.

This newly-defined SIB can be named as SystemInformationBlockTypeX. The structure of this newly-defined SystemInformationBlockTypeX can be illustrated by the following codes:

```
--ASN1START
SystemInformationBlockTypeX ::=      SEQUENCE {
    neighbCellMbmsInfoList-r11    NeighbCell-MBMSInfoList-r11,
}
neighbCellMbmsInfoList-r11 ::= SEQUENCE (SIZE(1.. maxCellInter+maxCellIntra))
OF neighbCellMbmsInfo-r11
neighbCellMbmsInfo-r11 ::=   SEQUENCE{
    physCellId           PhysCellId,
    mbms-ServiceIdList   SEQUENCE(SIZE(1..
                          maxMBSFN-Area*maxPMCH-PerMBSFN*maxSession
                          PerPMCH))
                                       OF OCTET STRING (SIZE (3))

...,
}
--ASN1STOP
```

Wherein physCellId denotes a neighbouring cell identifier, and mbms-ServiceIdList denotes a list of an identifier of an MBMS service supported in the neighboring cell identified by the corresponding identifier.

According to another embodiment of the present invention, the multimedia broadcast multicast service MBMS service information of the at least one neighboring cell comprises a carrier frequency; and a list of an identifier of an MBMS service supported at the carrier frequency.

In this case, a user terminal is notified of the list of an identifier of an MBMS service at each carrier frequency. Therefore, the UE can check whether there is a MBMS service of its interest at the frequency supported by it.

Then, the structure of this newly-defined SystemInformationBlockTypeX can be illustrated by the following codes:

```
--ASN1START
SystemInformationBlockTypeX ::=      SEQUENCE {
    neighbCellMbmsInfoList-r11   NeighbCell-MBMSInfoList-r11,
}
neighbCellMbmsInfoList-r11 ::= SEQUENCE (SIZE(1..maxInter-frequency)) OF
neighbCellMbmsInfo-r11
neighbCellMbmsInfo-r11 ::=    SEQUENCE {
    cellFrequency         carrierFreq,
    mbms-ServiceIdList    SEQUENCE (SIZE(1..
                          maxMBSFN-Area*maxPMCH-PerMBSFN*maxSession
                          PerPMCH))
                                    OF OCTET STRING (SIZE (3))
    ...,
}
--ASN1STOP
```

Wherein cellFrequecny denotes a carrier frequency of a neighboring cell, wherein different neighboring cells can operate either at different frequencies or at the same frequency; mbms-ServiceIdList denotes a list of an identifier of an MBMS service supported at the corresponding carrier frequency.

The transmission mechanism of this newly-defined SystemInformationBlockTypeX is the same as the transmission mechanism of current other type of SIBs. The transmission of SystemInformationBlockTypeX needs to be scheduled by a SIB1 and a UE supporting MBMS can know where to find the SystemInformationBlockTypeX if it is interested in it and desires to receive it.

The multimedia broadcast multicast service MBMS service information of the at least one neighboring cell of the base station can change, e.g., a corresponding neighboring cell increases one MBMS service or cancel one MBMS service.

Therefore, the base station needs to indicate to its user terminal(s) the change of the multimedia broadcast multicast service MBMS service information of the at least one neighboring cell included in the SystemInformationBlockTypeX, and notify the user terminal(s) of specific change of the multimedia broadcast multicast service MBMS service information of the at least one neighboring cell.

In order to allow for the change of the newly-defined SystemInformationBlockTypeX, specifically, the change of the multimedia broadcast multicast service MBMS service information of the at least one neighboring cell included in the SystemInformationBlockTypeX does not affect a UE not supporting MBMS and unnecessarily being notified the change of the newly-defined SIB, in an embodiment of the present invention, the updating notification of the newly-defined SIB is not relevant to the value tag, and therefore the change of the newly-defined SIB is only notified to a UE supporting MBMS.

In an embodiment of the present invention, the base station, by setting bits in a downlink control information DCI format 1C to be all zero, indicates to a user terminal the change of the multimedia broadcast multicast service MBMS service information of the at least one neighboring cell included in the SystemInformationBlockTypeX.

Currently, the DCI format 1C is used for a base station to notify a UE of a change of a MBMS point-to-multipoint Control Channel MCCH message.

The DCI format 1C with an M-RNTI (MBMS Radio Network Temporary Identifier) is used to notify that the MCCH message of which MBSFN area changes and require a UE to update the corresponding MCCH message.

Currently, the DCI formation 1C has 8 bits. Each bit reflects whether the MCCH message of the corresponding MBSFN area changes or not. Therefore, if the MCCH message of the corresponding MBSFN area changes, the corresponding bit in the 8 bits in the DCI formation 1C is set as 1, for example "01001000" indicates the MCCH messages of two MBSFN areas change and the indexes of the MBSFN areas subjected to the change are the second and the fifth.

If no MCCH message of MBSFN area changes, such notification will not occur. That it to say, for the case that a MCCH message changes, the case that all these 8 bits are zero values would not appear. Therefore, the all zero values of the bits in the DCI format 1C can be used to indicate to a user terminal the change of the multimedia broadcast multicast service MBMS service information of the at least one neighboring cell included in the SystemInformationBlockTypeX.

With regard to a UE supporting MBMS and camping on a base station of a cell having MBMS service transmission, since its base station can transmit occasion (namely, time) and period of the above MCCH message change notification, it knows the occasion and period of the above MCCH message change notification. Therefore, whenever the occasion of the above MCCH message change notification comes, it determines whether the 8 bits in the DCI format 1C are all zero. When the 8 bits in the DCI format 1C are determined to be all zero, it determines that the multimedia broadcast multicast service MBMS service information of the at least one neighboring cell included in the SystemInformationBlockTypeX changes, and in next system information modification period, reads the changed SystemInformationBlockTypeX to obtain new multimedia broadcast multicast service MBMS service information of the at least one neighboring cell.

With regard to a UE supporting MBMS and camping on a base station of a cell without MBMS service transmission, in principle any related MBMS service information and its relevant configuration information are not transmitted in the cell, so the UE does not know the occasion and period of the above MCCH message change notification.

Therefore, a mechanism is needed to notify the UE supporting MBMS and camping on the base station of the cell without the MBMS service transmission of the occasion and period for notifying the change of the multimedia broadcast multicast service MBMS service information of the at least one neighboring cell included in the SystemInformationBlockTypeX.

According to one embodiment of the present application, the base station can transmit to the user terminal notification configuration information via a system information block SIB 13, the notification configuration information is used to notify the user terminal of the occasion and period for notifying the change of the multimedia broadcast multicast service MBMS service information of the at least one neighboring cell included in the SystemInformationBlockTypeX. For example, "mcch-ModificationPeriod" in "MBSFN-AreaInfo" of "MBMS-NotificationConfig" information element and "MBSFN-AreaInfo' information element in the SIB 13 is used to define the occasion and period for notifying the change of the multimedia broadcast multicast service MBMS service information of the at least one neighboring cell included in the SystemInformationBlockTypeX. Other information in the SIB 13 can use a default value and does not make sense for a cell without MBMS service transmission. This embodiment means that for a cell without MBMS service transmission, the SIB 13 also needs to be transmitted to notify a user terminal of the occasion and period for notifying the change of the multimedia broadcast multicast service MBMS service information of the at least one neighboring cell included in the SystemInformationBlockTypeX.

According to another embodiment of the present invention, the notification configuration information can also be included in the SystemInformationBlockTypeX, and is used to notify a user terminal of the occasion and period for notifying the change of the multimedia broadcast multicast service MBMS service information of the at least one neighboring cell included in the SystemInformationBlockTypeX.

This embodiment completely complies with current MBMS configuration information transmission principle, i.e., only a cell having the MBMS service transmission can have MBMS configuration information transmission, e.g., transmission of the SIB 13 and MCCH message.

In an embodiment of the present invention, the notification configuration information included in the SystemInformationBlockTypeX is similar to the notification configuration information in the SIB 13.

The following codes show the structure of the SystemInformationBlockTypeX having the notification configuration information according to this embodiment:

```
--ASN1START
SystemInformationBlockTypeX ::=    SEQUENCE {
    neighbCellMbmsInfoList-r11   NeighbCell-MBMSInfoList-r11,
    sibXNotificationConfig-r11 SibX-NotificationConfiguration-r11,
}
neighbCellMbmsInfoList-r11 ::= SEQUENCE (SIZE(1.. maxCellInter+maxCellIntra))
OF neighbCellMbmsInfo-r11
neighbCellMbmsInfo-r11 ::=    SEQUENCE {
    physCellId         PhysCellId,
    mbms-ServiceIdList    SEQUENCE (SIZE(1..
                          maxMBSFN-Area*maxPMCH-PerMBSFN*maxSession
                          PerPMCH))
                                        OF OCTET STRING (SIZE (3))
    ...,
}
sibXNotificationConfig-r11 ::= SEQUENCE {
        notificationConfig-r9        MBMS-NotificationConfig-r9,
        mcch-ModificationPeriod-r11     ENUMERATED {rf512, rf1024},
}
--ASN1STOP
```

Wherein notificationConfig denotes the occasion of notification of the change, and mcch-ModificationPeriod denotes the period of notification of the change.

In another embodiment of the present invention, the notification configuration information included in the SystemInformationBlockTypeX is similar to paging occasions used for paging a UE in idle mode and for system information change, but new RNTI can be used to differentiate the two paging.

The following codes show the structure of the SystemInformationBlockTypeX having the notification configuration information according to this embodiment:

```
--ASN1START
SystemInformationBlockTypeX ::=    SEQUENCE {
    neighbCellMbmsInfoList-r11   NeighbCell-MBMSInfoList-r11,
    sibXNotificationConfig-r11 SibX-NotificationConfiguration-r11,
}
neighbCellMbmsInfoList-r11 ::= SEQUENCE (SIZE(1.. maxCellInter+maxCellIntra))
OF neighbCellMbmsInfo-r11
neighbCellMbmsInfo-r11 ::=    SEQUENCE {
    physCellId         PhysCellId,
    mbms-ServiceIdList    SEQUENCE (SIZE(1..
                          maxMBSFN-Area*maxPMCH-PerMBSFN*maxSession
                          PerPMCH))
                                        OF OCTET STRING (SIZE (3))
    ...,
```

```
}
sibXNotificationConfig-r11 ::= SEQUENCE {
        notificationCycle-r11       ENUMERATED{
                                             rf32, rf64, rf128, rf256,
rf512},
        nC                          ENUMERATED{
                                             furT, twoT, halfT,
quarterT, oneEighthT, oneSixteenthT,         oneThirtySecondT},
        sibX-ModificationPeriod-r11  ENUMERATED {rf512, rf1024},
}
--ASN1STOP
```

Wherein notificationCycle defines the cycle length of the notification and nC is used to derive notification frame and notification occasion.

Notification frame and notification occasion may cater for MBMS service ID or group of MBMS service on a MBMS frequency layer. For example, if a UE is interested in receiving one particular service, the UE only needs to listen to the notification occasion for that particular service. Similarly, if the UE is interested in a particular MBMS frequency, the UE only needs to listen to the notification occasion of the particular MBMS frequency.

After obtaining the notification configuration information, a UE camping on a cell of a base station without MBMS service transmission can, as described above, determine whether the 8 bits in the DCI format 1C are all zero when the notification occasion comes. When the 8 bits in the DCI format 1C are determined all zero, it determines that the multimedia broadcast multicast service MBMS service information of the at least one neighboring cell included in the SystemInformationBlockTypeX changes, and in next system information modification period, reads the changed SystemInformationBlockTypeX to obtain new multimedia broadcast multicast service MBMS service information of the at least one neighboring cell.

According to the above embodiment of the present invention, the notification and transmission of the change of the multimedia broadcast multicast service MBMS service information of the at least one neighboring cell included in the SystemInformationBlockTypeX is performed in a non-value tag manner, so a UE not supporting MBMS is not impacted.

Figure 2:
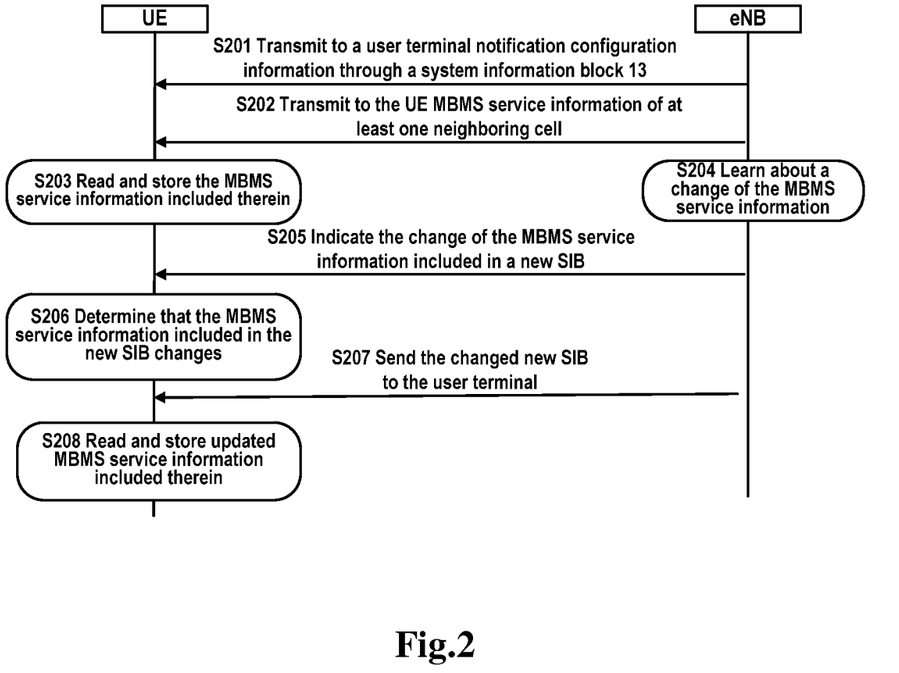
FIG. 2 illustrates a flow chart of a method of transmitting multimedia broadcast multicast service MBMS service information of at least one neighboring cell of a cell of a base station between a UE camping on the base station and the base station according to an embodiment of the present invention.

FIG. 2 illustrates a flow chart of a method of transmitting MBMS service information of a neighboring cell of a cell of a base station between a UE and the base station where the UE camps according to an embodiment of the present invention. The UE is for example the UE 110 as shown in FIG. 1.

First, at step S201, the base station, through a system information block 13, sends to the user terminal notification configuration information which is used to notify the user terminal of occasion and period for notifying a change of multimedia broadcast multicast service MBMS service information of the at least one neighboring cell included in the SystemInformationBlockTypeX.

Certainly, those skilled in the art can understand that in the case that the SystemInformationBlockTypeX includes the above notification configuration information, step S201 is not needed in the cell without the MBMS service transmission.

Then, at step S202, in the SystemInformationBlockTypeX, the base station sends to the user terminal the multimedia broadcast multicast service MBMS service information of the at least one neighboring cell.

At step S203, the user terminal UE, after receiving the SystemInformationBlockTypeX, reads the multimedia broadcast multicast service MBMS service information of the at least one neighboring cell included in the SystemInformationBlockTypeX and stores the read multimedia broadcast multicast service MBMS service information of the at least one neighboring cell included in the SystemInformationBlockTypeX.

Thereafter, at step S204, the base station learns about the change of the multimedia broadcast multicast service MBMS service information of the at least one neighboring cell. Therefore, at step S205, the base station, on the occasion of notification of the change of the multimedia broadcast multicast service MBMS service information, indicates to the user terminal the change of the multimedia broadcast multicast service MBMS service information of the at least one neighboring cell included in the SystemInformationBlockTypeX by setting the bits in the downlink control information DCI format 1C to be all zero.

At step S206, the user terminal determines that the bits in the downlink control information DCI format 1C are set to be all zero and thus determines that the multimedia broadcast multicast service MBMS service information of the at least one neighboring cell included in the SystemInformationBlockTypeX changes.

At step S207, in next system information modification period, the base station sends the changed SystemInformationBlockTypeX to the user terminal so as to send to the user terminal the updated multimedia broadcast multicast service MBMS service information of the at least one neighboring cell.

At step S208, after receiving the updated SystemInformationBlockTypeX, the user terminal reads the updated multimedia broadcast multicast service MBMS service information of the at least one neighboring cell included in the SystemInformationBlockTypeX and stores the read updated multimedia broadcast multicast service MBMS service information of the at least one neighboring cell.

Depending on situations, steps S204-S208 can be performed many times.

Figure 3:
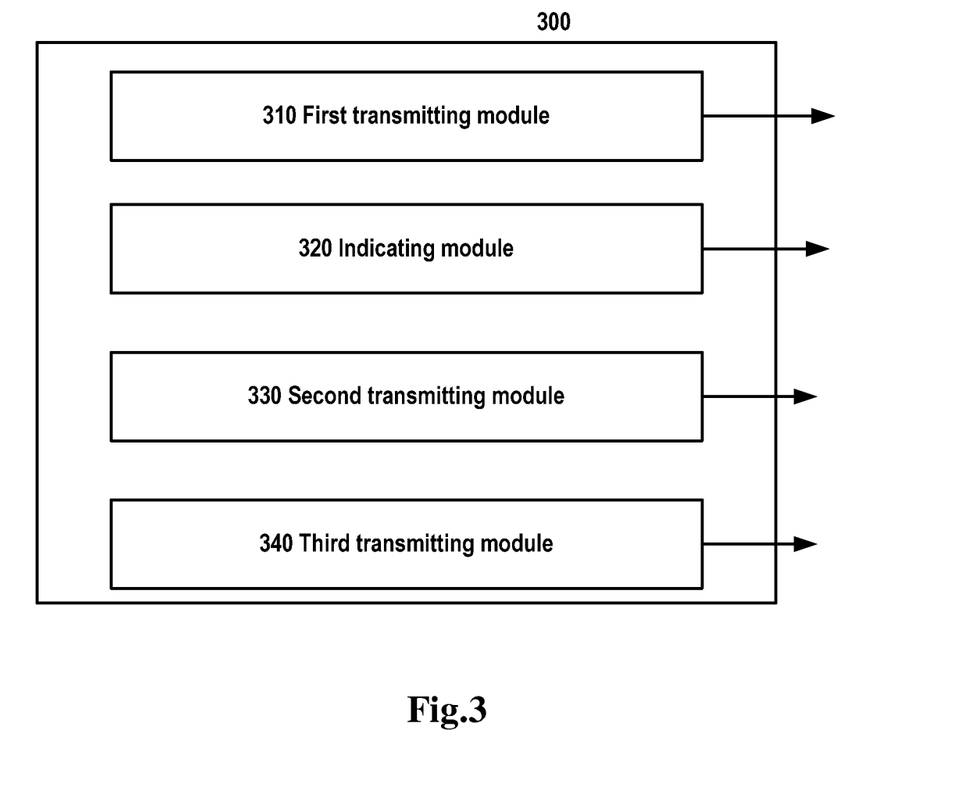
FIG. 3 schematically illustrates a block diagram of a base station for notifying a user terminal camping on the base station of multimedia broadcast multicast service MBMS service information of at least one neighboring cell of a cell of the base station according to one embodiment of the present invention.

FIG. 3 schematically illustrates a block diagram of a base station for notifying a user terminal camping on the base station of multimedia broadcast multicast service MBMS service information of at least one neighboring cell of a cell of the base station according to one embodiment of the present invention.

As shown in FIG. 3, the base station 300 comprises: a first transmitting module 310 configured to transmit to the user terminal, in a system information block SIB, the multimedia broadcast multicast service MBMS service information of the at least one neighboring cell.

According to an embodiment of the present invention, the system information block is a system information block newly defined in order to notify the user terminal of the multimedia broadcast multicast service MBMS service information of the at least one neighboring cell.

According to an embodiment of the present invention, the multimedia broadcast multicast service MBMS service information of the at least one neighboring cell comprises a cell identifier; and a list of an identifier of an MBMS service supported by the cell identified by the cell identifier.

According to an embodiment of the present invention, the multimedia broadcast multicast service MBMS service information of the at least one neighboring cell comprises: a carrier frequency; and a list of an identifier of an MBMS service supported at the carrier frequency.

According to an embodiment of the present invention, the base station 300 further comprises: an indicating module 320 configured to indicate to the user terminal a change of the multimedia broadcast multicast service MBMS service information of the at least one neighboring cell included in the system information block by setting bits in a downlink control information DCI format 1C to be all zero.

According to an embodiment of the present invention, the base station 300 further comprises: a second transmitting module 330 configured to transmit to the user terminal an updated edition of the system information block so as to notify the user terminal of the change of the multimedia broadcast multicast service MBMS service information of the at least one neighboring cell.

According to an embodiment of the present invention, the base station 300 further comprises: a third transmitting module 340 configured to transmit to the user terminal, through a system information block 13, notification configuration information which is used to notify the user terminal of occasion and period for notifying the change of the multimedia broadcast multicast service MBMS service information of the at least one neighboring cell included in the system information block.

According to an embodiment of the present invention, the system information block further comprises notification configuration information which is used to notify the user terminal of occasion and period for notifying the change of the multimedia broadcast multicast service MBMS service information of the at least one neighboring cell included in the system information block.

Figure 4:
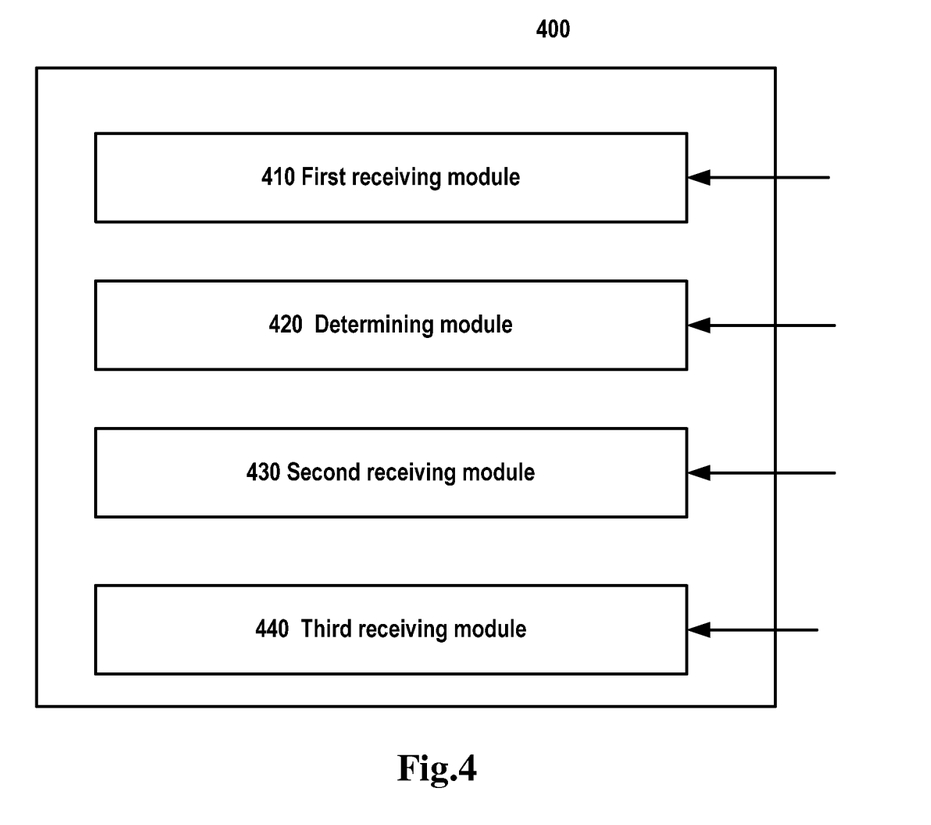
FIG. 4 schematically illustrates a block diagram of a user terminal for receiving from a base station where the user terminal camps multimedia broadcast multicast service MBMS service information of at least one neighboring cell of a cell of the base station according to one embodiment of the present invention.

FIG. 4 schematically illustrates a block diagram of a user terminal for receiving from a base station where the user terminal camps multimedia broadcast multicast service MBMS service information of at least one neighboring cell of a cell of the base station according to one embodiment of the present invention.

As shown in FIG. 4, the user terminal 400 comprises a first receiving module 410 configured to receive from the base station, in a system information block SIB, the multimedia broadcast multicast service MBMS service information of the at least one neighboring cell.

According to an embodiment of the present invention, the system information block is a system information block newly defined in order to notify the user terminal of the multimedia broadcast multicast service MBMS service information of the at least one neighboring cell.

According to an embodiment of the present invention, the multimedia broadcast multicast service MBMS service information of the at least one neighboring cell comprises a cell identifier; and a list of an identifier of an MBMS service supported by the cell identified by the cell identifier.

According to an embodiment of the present invention, the multimedia broadcast multicast service MBMS service information of the at least one neighboring cell comprises: a carrier frequency; and a list of an identifiers of an MBMS service supported at the carrier frequency.

According to an embodiment of the present invention, the user terminal 400 further comprises: a determining module 420 configured to determine whether the multimedia broadcast multicast service MBMS service information of the at least one neighboring cell included in the system information block changes by determining whether bits in a downlink control information DCI format 1C are set to be all zero.

According to an embodiment of the present invention, the user terminal 400 further comprises: a second receiving module 430 configured to receive from the base station an updated edition of the system information block to notify the user terminal of the change of the multimedia broadcast multicast service MBMS service information of the at least one neighboring cell.

According to an embodiment of the present invention, the user terminal 400 further comprises: a third receiving module 440 configured to receive from the base station, through a system information block 13, notification configuration information which is used to notify the user terminal of occasion and period for notifying the change of the multimedia broadcast multicast service MBMS service information of the at least one neighboring cell included in the system information block.

According to an embodiment of the present invention, the system information block further comprises notification configuration information which is used to notify the user terminal of occasion and period for notifying the change of the multimedia broadcast multicast service MBMS service information of the at least one neighboring cell included in the system information block.

It should be noted that in order to make the present invention more comprehensible, the above description omits some more specific technical details which are known to the skilled in the art and may be essential for the implementation of the present invention.

Those skilled in the art should further understand that the present invention is not limited to the above described steps, and the present invention further includes a combination of the above described steps, or sequence switch thereof, etc. The final scope of the present invention is defined by the appended claims.

Thus, selecting and describing the preferred embodiments is to better illustrate the principle and practical application of the present invention and to enable a person of normal skill in the art to understand that without departing the spirit of the present invention, all modifications and alterations fall within the protection scope of the present invention as limited by the appended claims.

What is claimed is:

1. A method of notifying a user terminal of multimedia broadcast multicast service MBMS service information of at least one neighboring cell of a cell of a base station where the user terminal camps, comprising:
   in a system information block SIB, which is independent of a SIB 13,
   transmitting, in the system information block SIB, to the user terminal the multimedia broadcast multicast service MBMS service information of the at least one neighboring cell, wherein the multimedia broadcast multicast service MBMS service information of the at least one neighboring cell comprises a carrier frequency and a list of an identifier of an MBMS service supported at the carrier frequency;
   indicating to the user terminal a change of the multimedia broadcast multicast service MBMS service information of the at least one neighboring cell included in the system information block by setting bits in a downlink control information DCI format 1C.

2. The method according to claim 1, further comprising:
indicating to the user terminal a change of the multimedia broadcast multicast service MBMS service information of the at least one neighboring cell included in the system information block by setting bits in the downlink control information DCI format 1C to be all zero, and transmitting to the user terminal the updated system information block to notify the user terminal of the change of the multimedia broadcast multicast service MBMS service information of the at least one neighboring cell.

3. The method according to claim 1, further comprising:
through a system information block, transmitting to the user terminal notification configuration information which is used to notify the user terminal of occasion and period for notifying a change of the multimedia broadcast multicast service MBMS service information of the at least one neighboring cell included in the system information block.

4. The method according to claim 1, wherein the system information block further comprises:
notification configuration information which is used to notify the user terminal of occasion and period for notifying a change of the multimedia broadcast multicast service MBMS service information of the at least one neighboring cell included in the system information block.

5. The method according to claim 1, wherein the multimedia broadcast multicast service MBMS service information of the at least one neighboring cell comprises:
a carrier frequency; and
a list in the new system information block defined of an identifier of an MBMS service supported at the carrier frequency, wherein the new system information block includes a carrier frequency of a neighboring cell, wherein different neighboring cells can operate either at different frequencies or at the same frequency.

6. A method in a base station comprising:
transmitting, in a system information block SIB, which is independent of a SIB 13, to the user terminal the multimedia broadcast multicast service MBMS service information of the at least one neighboring cell;
indicating to the user terminal a change of the multimedia broadcast multicast service MBMS service information of the at least one neighboring cell included in the system information block SIB by setting bits in a downlink control information DCI format IC to be all zero;
transmitting to the user terminal an updated edition of the system information block SIB so as to notify the user terminal of the change of the multimedia broadcast multicast service MBMS service information of the at least one neighboring cell, wherein the multimedia broadcast multicast service MBMS service information of the at least one neighboring cell comprises a carrier frequency and a list of an identifier of an MBMS service supported at the carrier frequency; and
transmitting to the user terminal, through a system information block, notification configuration information which is used to notify the user terminal of occasion and period for notifying the change of the multimedia broadcast multicast service MBMS service information of the at least one neighboring cell included in the system information block SIB.

7. The method according to claim 6, wherein the multimedia broadcast multicast service MBMS service information of the at least one neighboring cell comprises:
a carrier frequency; and
a list in the new system information block defined of an identifier of an MBMS service supported at the carrier frequency, wherein the new system information block includes a carrier frequency of a neighboring cell, wherein different neighboring cells can operate either at different frequencies or at the same frequency.

8. A method in a user terminal comprising:
receiving, in a system information block SIB, which is independent of a SIB 13, from the base station the multimedia broadcast multicast service MBMS service information of the at least one neighboring cell, wherein the multimedia broadcast multicast service MBMS service information of the at least one neighboring cell comprises a carrier frequency and a list of an identifier of an MBMS service supported at the carrier frequency;
determining whether the multimedia broadcast multicast service MBMS service information of the at least one neighboring cell included in the system information block SIB is changed by determining whether bits in a downlink control information DCI format 1C are set to zero;
receiving from the base station an updated system information block SIB to notify the user terminal of the multimedia broadcast service MBMS service information of the at least one neighboring cell; and
receiving from the base station through a system information block, notification configuration information which is used to notify the user terminal of occasion and period for notifying the change of the multimedia broadcast multicast service MBMS service information of the at least one neighboring cell included in the system information block SIB.

9. The method according to claim 8, wherein the multimedia broadcast multicast service MBMS service information of the at least one neighboring cell comprises:
a carrier frequency; and
a list in the new system information block defined of an identifier of an MBMS service supported at the carrier frequency, wherein the new system information block includes a carrier frequency of a neighboring cell, wherein different neighboring cells can operate either at different frequencies or at the same frequency.

10. A method of receiving from a base station where a user terminal camps multimedia broadcast multicast service MBMS service information of at least one neighboring cell of a cell of the base station, comprising:
in a system information block SIB, which is independent of a SIB 13, receiving from the base station the multimedia broadcast multicast service MBMS service information of the at least one neighboring cell, wherein the multimedia broadcast multicast service MBMS service information of the at least one neighboring cell comprises a carrier frequency and a list of an identifier of an MBMS service supported at the carrier frequency;
determining whether the multimedia broadcast multicast service MBMS service information of the at least one neighboring cell included in the system information block changes based on bits in a downlink control information DCI format 1C.

11. The method according to claim 10, further comprising:

determining whether the multimedia broadcast multicast service MBMS service information of the at least one neighboring cell included in the system information block changes by determining whether bits in the downlink control information DCI format 1C are set to be all zero, and receiving from the base station the updated system information block to notify the user terminal of the change of the multimedia broadcast multicast service MBMS service information of the at least one neighboring cell.

12. The method according to claim 10, further comprising:

through a system information block, receiving from the base station notification configuration information which is used to notify the user terminal of occasion and period for notifying a change of the multimedia broadcast multicast service MBMS service information of the at least one neighboring cell included in the system information block.

13. The method according to claim 10, wherein the system information block further comprises:

notification configuration information which is used to notify the user terminal of occasion and period for notifying a change of the multimedia broadcast multicast service MBMS service information of the at least one neighboring cell included in the system information block.

14. The method according to claim 10, wherein the multimedia broadcast multicast service MBMS service information of the at least one neighboring cell comprises:

a carrier frequency; and a list in the new system information block defined of an identifier of an MBMS service supported at the carrier frequency, wherein the new system information block includes a carrier frequency of a neighboring cell, wherein different neighboring cells can operate either at different frequencies or at the same frequency.

\* \* \* \* \*